UNITED STATES PATENT OFFICE 2,571,804

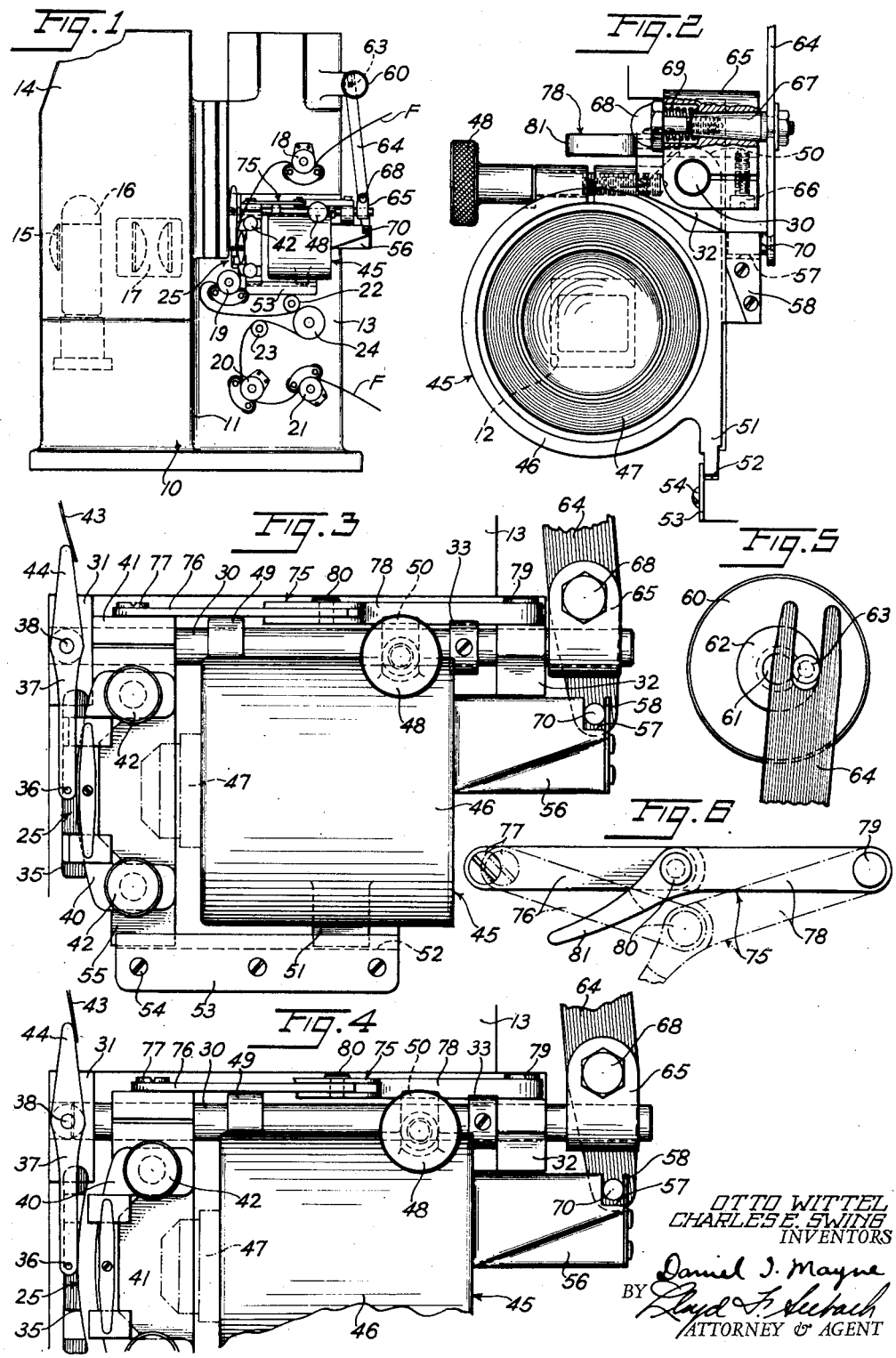

LENS MOUNT AND FILM GATE ARRANGEMENT FOR PROJECTION APPARATUS

Otto Wittel and Charles E. Swing, Rochester, N. Y., assignors to Eastman Kodak Company, Rochester, N. Y., a corporation of New Jersey Application June 27, 1950, Serial No. 170,490

6 Claims. (Cl. 88—24)

This invention relates to photographic projection apparatus and more particularly to a novel arrangement of a lens mounting means, a film gate assembly, and the focusing means for said lens mounting means.

Heretofore, where the back focus of the projection lens was such that sufficient space was available between the film plane and the end of the lens mount, the film gate was arranged so that it could be opened to a position for threading a film strip therebetween without interfering with the projection lens mount. In such instances the gate usually includes a sleeve which telescopes into the lens mount and at the same time prevents scattering of any light. However, where the back focus of the projection lens is relatively short because of the use of a field flattener, it then becomes necessary to move the lens mount with the gate member to obtain the necessary distance between the gate members to facilitate threading the film strip. This is accomplished in the present invention by mounting a lens mounting sleeve on a support member in such a manner that it is movable therealong and with the support member as it is moved and by securing the movable member of the gate assembly to said support member. The support member also has secured thereto a fulcrum block on which a focusing lever is pivotally mounted, said focusing lever having one end connected to the lens mount and the other end eccentrically connected to a manually rotatable focusing knob. This arrangement permits the projection lens to be properly focused by moving said mount along the support member either toward or away from the film plane. An actuating linkage is connected between the casing and the support member so that upon manual actuation of said linkage the support member, movable gate member, lens mount, and fulcrum block are moved as a unit either away from or toward the fixed member of the gate assembly and, at the same time, insures that the projection lens will be properly positioned in its focused position when the film gate members are in their normal projection position with the film strip positioned therebetween.

The primary object of the invention, therefore, is to provide a photographic projection apparatus with a projection lens mounting means which may be moved together with its support member, a movable gate member and its focusing means either away from or toward the fixed gate member of a film gate assembly.

Another object of the invention is to provide a photographic projection lens mounting means which may be moved independently of a film gate assembly for focusing the lens contained therein or moved with the movable member of said assembly to a position for permitting a film strip to be inserted in said gate assembly.

Still another object of the invention is to provide a photographic projection lens mounting means with a focusing arrangement which permits said mounting means to be moved with respect to a film gate assembly and to be moved with a member of said gate assembly and which insures proper positioning of the lens mounting means in its predetermined and focused position.

Other and further objects and advantages of the invention will be suggested to those skilled in the art by the description which follows:

The objects of the invention are embodied in a projection apparatus provided with an optical axis and comprising a casing having a projection aperture aligned with said axis; a support means slidably mounted on said casing parallel to said axis; a film gate assembly including a fixed and a movable member; a lens mounting means mounted on said support means and adapted to be moved therealong and therewith; a fulcrum block secured to said support means; a focusing knob; a focusing lever pivotally mounted on said block and connected to said knob and lens mounting means for moving said lens mounting means along said support means upon rotation of said knob; and an actuating linkage connected to said support means and to said casing for moving said support means axially to permit a film strip to be inserted between said gate members and to position said film strip in its projection plane.

Reference is now made to the accompanying drawing wherein like reference numerals designate like parts and wherein:

Fig. 1 is a side elevation of a projection apparatus showing the relation of the various elements and the film path, the film reels and the supporting arms therefor being omitted;

Fig. 2 is a front elevation of the lens mounting means and showing the arrangement for mounting said means on the casing;

Fig. 3 is a side elevation of the projection lens mounting means, film gate assembly, focusing arrangement and the support means and showing the relation of these elements in the projection position with the lens mounting means in its extreme right-hand position;

Fig. 4 is a side elevation similar to Fig. 3 and showing the relation of the various elements upon actuation of the linkage for moving the support means to the right to separate the gate assembly for threading a film strip between the members thereof;

Fig. 5 is a detail view showing the eccentric connection between the focusing knob and focusing lever; and Fig. 6 is a detail view of the toggle actuating linkage showing in full lines its normal position for maintaining the respective elements in their projection position, as in Fig. 3, and in dotted lines the position it assumes when the elements are moved to their open or threading position, as in Fig. 4.

Although the improved focusing and threading arrangement is illustrated and described with respect to a motion picture projection apparatus, it is to be understood that the invention is also applicable to other types of photographic apparatus.

According to the illustrated embodiment of the invention, the projector casing 10 is mounted within a cabinet or housing, not shown, and comprises a vertical wall 11 provided with an aperture 12, a vertical wall 13 arranged substantially at right angles to wall 11, and a lamp housing 14 in which reflector 15, lamp 16 and the condenser lens system 17 are aligned with aperture 12 in a well-known manner. On the wall 13 are mounted film drive sprockets 18, 19, 20 and 21, idler rolls 22 and 23 and the sound drum 24, the film strip being threaded from the supply reel, not shown, through a suitable aperture in the cabinet under sprocket 18, into film gate assembly 25, under sprocket 19, under idler roll 22 and around drum 24, over idler roll 23, around sprockets 20 and 21 and through a suitable aperture in the cabinet to the usual take-up reel.

The support means or rod 30 is slidably mounted in spaced bearings 31 and 32 which are integral with wall 13, the axial movement of said rod to the right being limited by the collar 33 fixed thereto. The film gate assembly 25 comprises an apertured fixed member 35, which is pivotally mounted at 36 to a yoke member 37 pivotally mounted at 38 to bearing 31, and an apertured movable member 40 secured to bracket 41 by attaching screws 42, said bracket being secured to rod 30 and movable therewith in a manner to be described. The facing surfaces of the gate members 35 and 40 may be provided with suitable film engaging rails and the film strip is positioned in its proper projection plane when the respective members are engaged, as shown in Fig. 3. Since gate member 40 is fixed to bracket 41 which, in turn, is fixed to rod 30, axial movement of rod 30 to the left is arrested when gate member 40 engages fixed gate member 35 and bracket 41 abuts bearing 31. To insure proper engagement between gate members 35 and 40, a leaf spring 43, which is fixed to wall 11, engages the end 44 of yoke member to urge fixed member 35 toward movable member 40. While some movement of member 35 must be permitted to secure proper engagement and alignment of the film engaging surfaces, the relative movement of member 35 as compared with that of member 40 is of such an order that it may be termed as the fixed member and thereby differentiates it from member 40 which is actually moved some distance as described hereinafter.

The lens mounting means 45 comprises a cylindrical sleeve 46 which is adapted to receive a lens mount 47 which is clamped in position in said sleeve by finger screw 48. The sleeve is provided with two spaced ears 49 and 50 having apertures for receiving rod 30 for movement therealong and therewith. To prevent turning of said lens mounting means about said rod, said sleeve is provided with a vertical extension 51 which engages a recess 52 in wall 13 and which is retained by plate 53 secured to wall 13 by screws 54. A similar extension 55 is formed on the end of bracket 41 and is also received by recess 52 and retained by plate 53. A horizontal extension 56 is also formed integral with sleeve 46 and is provided at the end thereof with a notch 57 which is enclosed on one end thereof by a resilient plate 58, see Figs. 2 and 3, for a purpose about to be described.

The focusing means comprises a manually rotatable knob 60 which may be mounted exteriorly of the cabinet on a shaft 61 having a collar 62 fixed to the end thereof with a stud 63 eccentrically secured to said collar, a focusing lever 64 and a fulcrum block 65. The fulcrum block 65 is clamped to rod 30 by screw 66 to the right of bearing 32, see Figs. 2-4, and is movable with said rod. The focusing lever 64 is bifurcated at one end to receive stud 63 and is pivotally mounted on fulcrum block 65 by means of a tapered or conical stud 67 which is drawn into position in said fulcrum block by cap screw 68 against the action of coil spring 69. This manner of pivotally mounting focusing lever 64 prevents any backlash and permits accurate focusing of the projection lens irrespective of the direction of rotation of knob 60. Stud 70 is carried by the other end of lever 64 and engages notch 57 in extension 56.

Upon rotation of knob 60 in a clockwise direction, with reference to Fig. 1, lever 64 is pivoted about stud 67 by stud 63, fulcrum block 65 being fixed on rod 30, thereby moving stud 70 in a clockwise direction and moving lens mounting means 45 and lens mount 47 to the left along rod 30 to locate the lens in mount 47 in its properly focused projection position, it being understood, of course, that lens mounting means 45 is normally in a central position on rod 30 so that knob 60 may be turned in either direction to properly focus the projection lens. A suitable means for locking knob 60 against rotation may be used to prevent accidental rotation thereof and may be in the form of an eccentric friction locking means which may engage shaft 61 within the cabinet or which may engage knob 60 on the outside of the cabinet.

The actuating linkage 75 is of the toggle type in which link 76 is pivotally secured to bracket 41 at 77 and link 78 is pivotally secured to bearing 32 by stud 79, said links being pivotally connected together by stud 80. Link 78 is provided with a formed out finger portion 81 to permit easy manual actuation of the linkage from the full line position or position in which all the elements are in their proper projection position, as shown in Figs. 3 and 6, to the broken line or threading position, as shown in Figs. 4 and 6. Since link 78 is fixed to bearing 32 and link 76 is fixed to bracket 41 which, in turn, is secured to rod 30, actuation of the linkage from the full line position in Fig. 6 to that of the dotted line moves bracket 41 and rod 30 to the right. Consequently, the movable gate member 40 is also moved with bracket 41 to the right and away from fixed member 35. Also with the movement of rod 30, lens mounting means 45 and fulcrum block 65 are also moved to the right until collar 33 abuts bearing 32, thereby limiting or forming a stop for the toggle linkage, see Fig. 4.

As fulcrum block 65 and stud 70 are moved to the right, the fulcrum lever 64 is pivoted about stud 63. However, since the pivot point of lever 64 lies between the centers of studs 63 and 70, the movement of stud 70 must of necessity be greater than that of fulcrum block 65, and with lens mounting means 45 movable along rod 30 its axial movement is therefore slightly greater than that of rod 30, gate member 40 and fulcrum block 65. This additional movement, however, is relatively small because of the close proximity of stud 70 to the pivot point of lever 64 in block 65 as compared with the distance between the pivot point of lever 64 and stud 63. With the actuating linkage 75 in the dotted line position, as indicated in Fig. 6, the various parts are then in the positions shown in Fig. 4 with gate member 40 removed from engagement with the fixed member 35 to permit the film strip to be inserted therebetween, or removed therefrom, and lens mounting means 45 has also been moved axially to prevent any interference with movable gate member 40.

Upon actuation of linkage 75 to its full line position, as shown in Fig. 6, rod 30 is moved to the left, thereby moving gate member 40 into engagement with fixed gate member 35, and moving lens mounting means 45 and fulcrum block 65 to their original positions, as shown in Fig. 3. From the foregoing description, it can be readily appreciated that a novel arrangement of a film gate assembly, lens mounting means, and focusing mechanism has been devised which are movable as a unit along a support member to permit threading a film strip in the gate assembly and which permits independent axial movement of the lens mounting means along the support means for focusing purposes.

Since other variations of the invention are possible, the scope of the invention is not to be limited in any respect by the present disclosure but is defined by the appended claims.

Having now particularly described our invention, what we desire to secure by Letters Patent of the United States and what we claim is:

1. In a projection apparatus provided with an optical axis, the combination comprising a casing having a projection aperture aligned with said axis, a support means slidably mounted on said casing parallel to said axis, a film gate assembly including a member fixed to said casing and a movable member secured to said support means, a lens mounting means mounted on said support means and adapted to be moved therealong and therewith, a fulcrum block secured to said support means, a manually rotatable focusing knob, a focusing lever pivotally mounted on said fulcrum block and operatively connected to said knob and lens mounting means for moving said lens mounting means along said support means upon rotation of said knob, and an actuating linkage operatively connected to said movable gate member and said casing and for moving said support means axially to permit a film strip to be inserted between said gate members and to position said film strip in said film gate assembly.

2. In a projection apparatus provided with an optical axis, the combination comprising a casing having a projection aperture aligned with said axis, a support means slidably mounted on said casing parallel to said axis, a film gate assembly including a member fixed to said casing and a movable member secured to said support means, a lens mounting means mounted on said support means and adapted to be moved therealong and therewith, a fulcrum block secured to said support means, a manually rotatable focusing knob, a focusing lever pivotally mounted on said fulcrum block and operatively connected to said knob and lens mounting means for moving said lens mounting means along said support means upon rotation of said knob and adapted to be pivoted about said knob upon axial movement of said supporting means, and an actuating linkage operatively connected to said movable gate member and said casing and for moving said support means axially to permit a film strip to be inserted between said gate members and to position said film strip in said film gate assembly.

3. In a projection apparatus provided with an optical axis, the combination comprising a casing having a projection aperture aligned with said axis, a support means slidably mounted on said casing parallel to said axis, a film gate assembly including a member fixed to said casing and a movable member secured to said support means, a lens mounting means mounted on said support means and adapted to be moved therealong for focusing a lens assembly contained therein and to be moved with said support means upon axial movement thereof in a direction away from said fixed gate member from a projection position to a threading position and upon axial movement of said support means in a direction toward said fixed gate member from said threading position to said projection position, a fulcrum block secured to said support means, a manually rotatable focusing knob, a focusing lever pivotally mounted on said fulcrum block and operatively connected to said knob and lens mounting means for moving said lens mounting means along said support means upon rotation of said knob and adapted to be pivoted about said knob upon axial movement of said supporting means, and an actuating linkage operatively connected to said movable gate member and said casing and for moving said support means axially in a direction away from said fixed gate member, to permit a film strip to be inserted between said gate members and in a direction toward said fixed gate member to position said film strip in said gate assembly.

4. In a projection apparatus provided with an optical axis, the combination comprising a casing having a projection aperture aligned with said axis, a support means slidably mounted on said casing parallel to said axis, a film gate assembly having a member fixed to said casing and a movable member secured to said support means, said members normally being in engagement to define a film plane, a lens mounting means mounted on said support means and adapted to be moved therealong and therewith, a fulcrum block secured to said support means, a manually rotatable focusing knob, a focusing lever pivotally mounted on said fulcrum block and operatively connected to said knob and lens mounting means for moving said lens mounting means along said support means upon rotation of said knob, and a toggle linkage including a first link having one end thereof operatively connected to said movable gate member and a second link operatively connected to said casing and having an actuating portion, said first-mentioned link being pivotally connected to said second link, and for moving said support means axially to permit a film strip to be inserted between said gate members and to position said film strip in said film plane.

5. In a projection apparatus provided with an optical axis, the combination comprising a casing having a projection aperture aligned with said axis and a vertical wall perpendicular to the plane of said aperture, a plurality of spaced bearing members on said wall, a support means slidably mounted in said bearing members, an apertured film gate assembly including a member fixed to said casing and a movable member secured to said support means, said members being normally in engagement to define a film plane, a lens mounting means mounted on said support means and adapted to be moved therealong and therewith, a fulcrum block secured to said support means, a manually rotatable focusing knob, a focusing lever pivotally mounted on said fulcrum block and having one end thereof operatively connected to said lens mounting means and the other end operatively and eccentrically connected to said knob for moving said lens mounting means along said axis and said support means toward and away from said gate assembly upon rotation of said knob, and an actuating linkage operatively connected to said movable gate member and one of said bearing members for maintaining said movable gate member and said lens mounting means in their respective projection positions and manually operable for moving said support means in said bearing members so that said lens mounting means and movable gate member are moved as a unit along said axis and in a direction away from said fixed gate member to permit a film strip to be inserted between said gate members and for returning said lens mounting means and movable gate member as a unit to their projection positions to position said film strip in said film plane.

6. In a projection apparatus provided with an optical axis, the combination comprising a casing having a projection aperture aligned with said axis and a vertical wall perpendicular to the plane of said aperture, a plurality of spaced bearing members on said wall, a rod slidably mounted in said bearing members, an apertured film gate assembly including a member fixed to said casing and a movable member secured to said rod, said members being normally in engagement to define a film plane, a lens mounting means mounted on said rod and adapted to be moved therealong for focusing a lens assembly contained therein and to be moved with said rod upon axial movement thereof in a direction away from said fixed gate member to a threading position and upon axial movement thereof in a direction toward said fixed gate member to be returned to its projection position, a fulcrum block secured to said rod, a manually rotatable focusing knob, a focusing lever pivotally mounted on said fulcrum block and operatively connected to said lens mounting means and operatively and eccentrically connected to said knob for moving said lens mounting means along said rod upon rotation of said knob and adapted to be pivoted about said knob upon axial movement of said rod, and a toggle linkage including a first link having one end thereof pivotally mounted on said movable gate member and a second link pivotally mounted on one of said bearing members and having an actuating portion, said first-mentioned link being pivotally connected to said second link, and for moving said rod axially to permit a film strip to be inserted between said gate members and to position said film strip in said film plane.

OTTO WITTEL.
CHARLES E. SWING.

REFERENCES CITED

The following references are of record in the file of this patent:

UNITED STATES PATENTS

| Number | Name | Date |
|---|---|---|
| 1,075,692 | Cannock | Oct. 14, 1913 |
| 1,165,629 | Schneider | Dec. 28, 1915 |
| 1,787,808 | Wittel | Jan. 6, 1931 |
| 1,857,152 | Holman | May 10, 1932 |
| 2,339,503 | Miller | Jan. 18, 1944 |
| 2,368,634 | Boecking | Feb. 6, 1945 |
| 2,506,948 | Wienke | May 9, 1950 |